No. 877,936. PATENTED FEB. 4, 1908.
W. R. MACDONALD.
HEATING AND VENTILATING SYSTEM.
APPLICATION FILED FEB. 12, 1907.
3 SHEETS—SHEET 3.
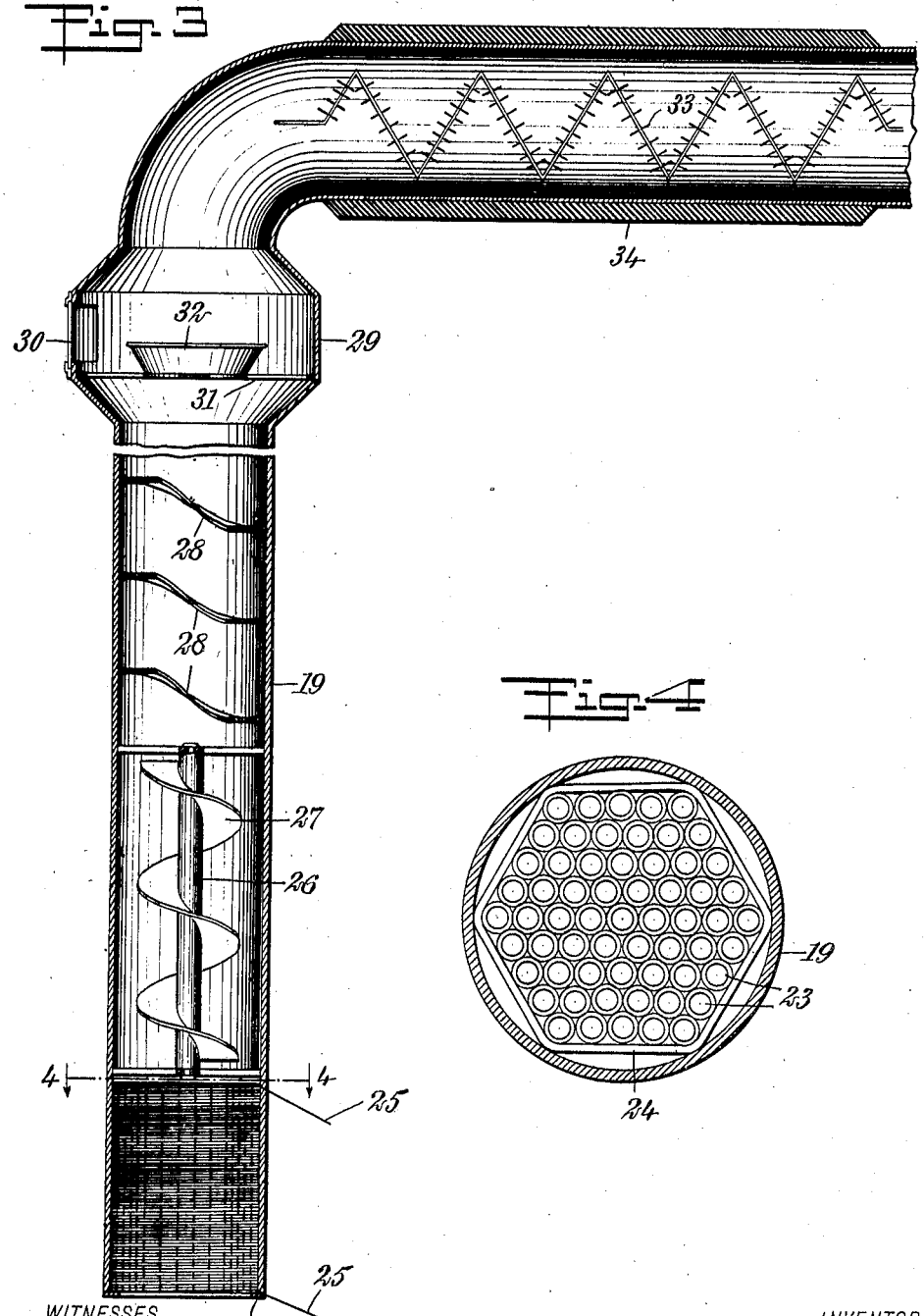

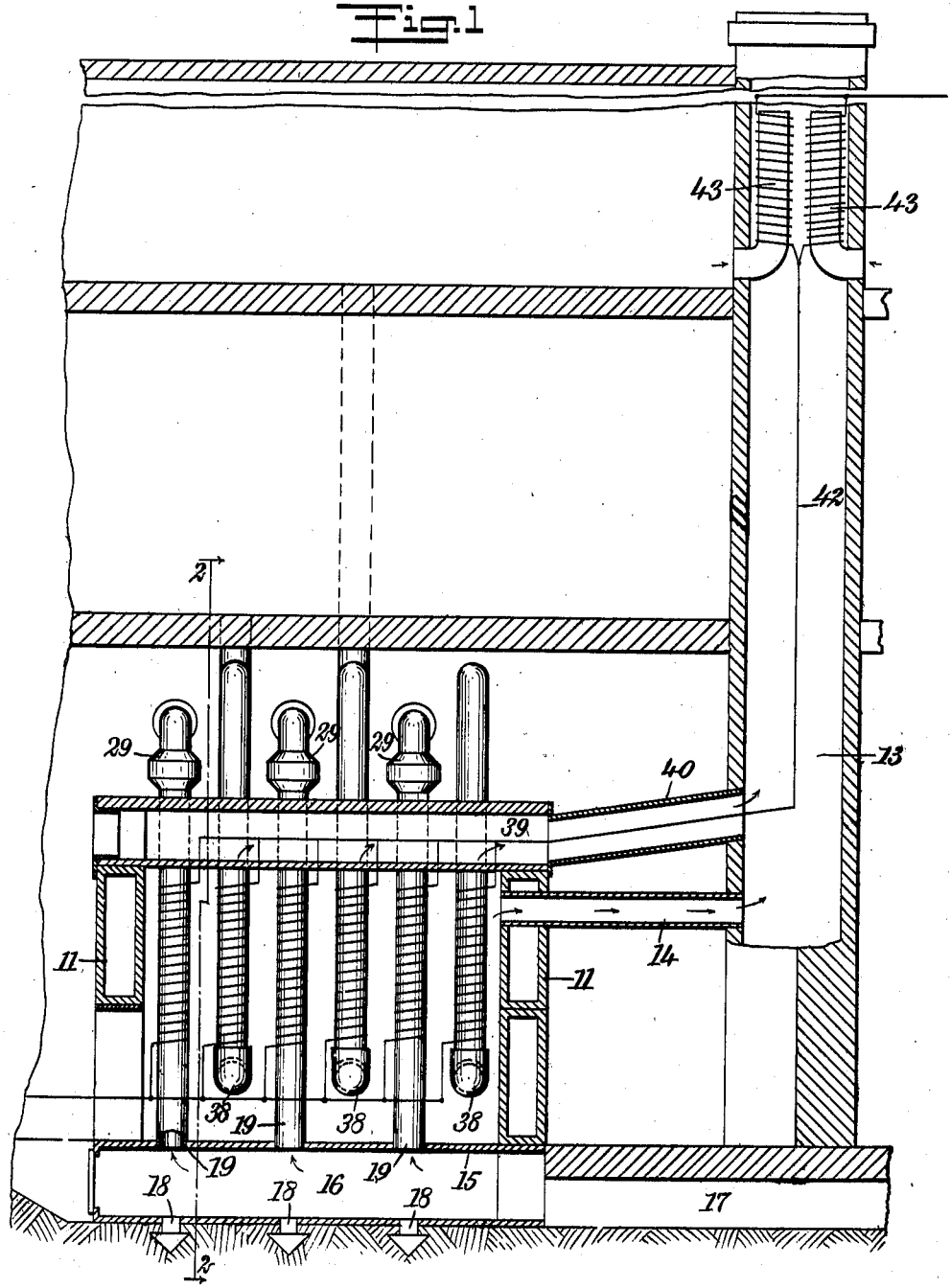

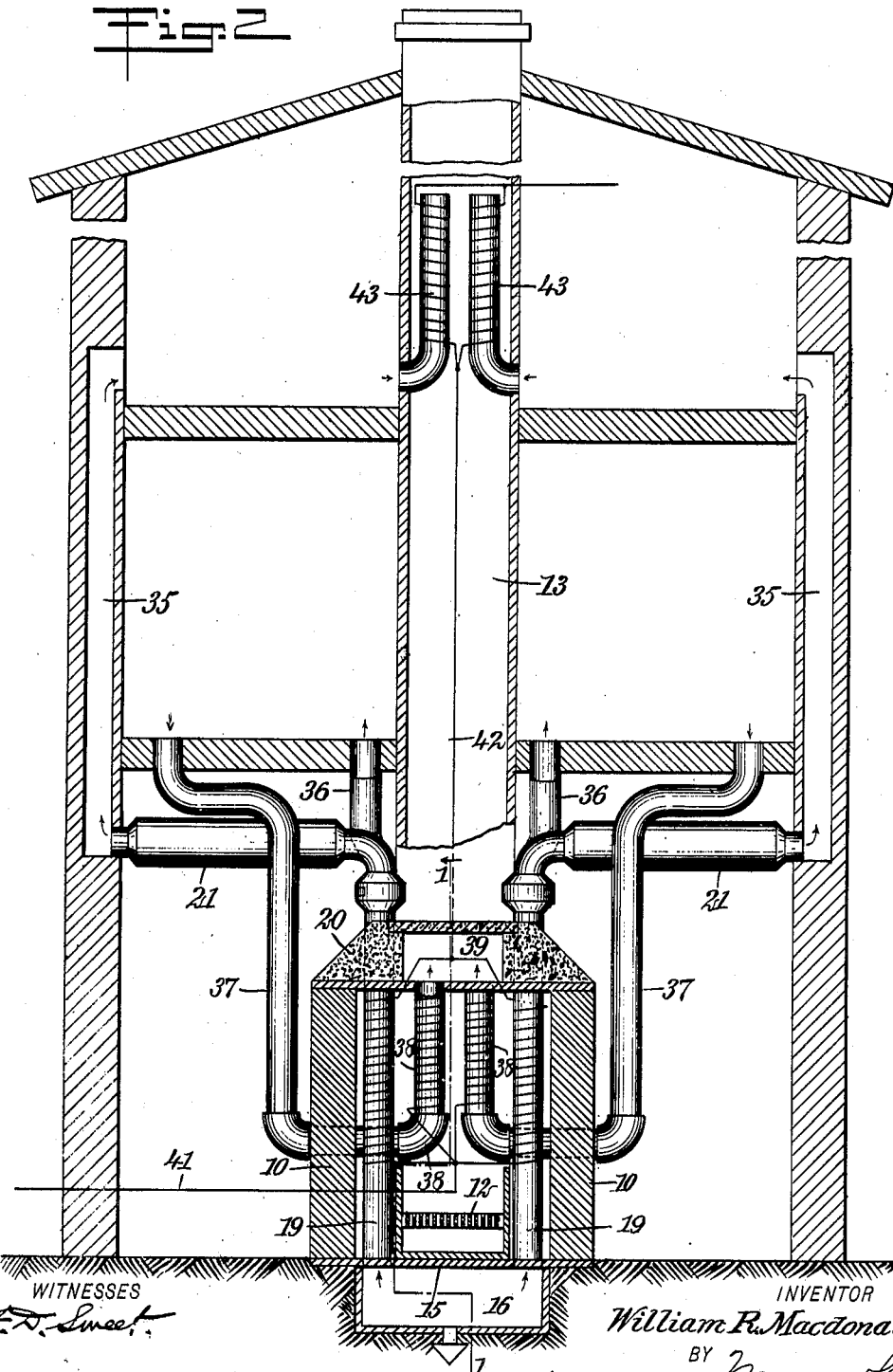

UNITED STATES PATENT OFFICE.

WILLIAM R. MACDONALD, OF PITTSBURG, PENNSYLVANIA.

HEATING AND VENTILATING SYSTEM.

No. 877,936.     Specification of Letters Patent.     Patented Feb. 4, 1908.

Application filed February 12, 1907. Serial No. 356,943.

*To all whom it may concern:*

Be it known that I, WILLIAM R. MACDONALD, a citizen of the United States, and a resident of Pittsburg, in the county of Allegheny and State of Pennsylvania, have invented a new and Improved Heating and Ventilating System, of which the following is a full, clear, and exact description.

This invention relates to certain improvements in heating and ventilating systems for residences, public buildings and the like, and relates more particularly to the means for heating and treating the air delivered to the rooms.

The object of the invention is to provide means whereby the air may be heated either by an ordinary combustion furnace or by electrical means, and at the same time treated electrically before it is delivered to the rooms.

A further object of the invention is to provide means for automatically circulating the air.

The invention consists in the construction and combination of parts, to be more fully described hereinafter and directly set forth in the claims.

Reference is to be had to the accompanying drawings forming a part of this specification, in which similar characters of reference indicate corresponding parts in all the figures.

Figure 1 is a vertical section through a building provided with a heating and ventilating system embodying my invention, a portion of said section being taken on the line 1—1 of Fig. 2; Fig. 2 is a transverse section of the device shown in Fig. 1, a portion of said section being taken on the line 2—2 of Fig. 1; Fig. 3 is a longitudinal section through one of the air delivery conduits, and Fig. 4 is a transverse section of said conduit taken on the line 4—4 of Fig. 3.

In carrying out my invention I preferably provide an air heating furnace having side walls 10 formed of any suitable material, and end walls 11 preferably formed of hollow refractory blocks. Within this casing is supported a grate 12, employed when the air is heated by combustion in the ordinary manner. The interior of the furnace communicates with the chimney 13 by a conduit 14, which latter is provided with any suitable form of damper (not shown). Beneath the bed plate 15 of the furnace I provide an air chamber 16 having a conduit 17 leading thereto and through which the air to be heated is supplied. The lower wall of the air chamber 16 is preferably provided with any suitable form of trap 18, whereby any moisture condensing from the air may be drawn off. Leading from this air chamber and extending upward through the bed plate 15 and upon opposite sides of the grate 12, I provide a plurality of conduits 19 through which the air passes on its way to the interior of the living rooms. The upper end of the conduits 19 extending through the upper insulated top 20 of the furnace are connected to the horizontally disposed conduits 21 leading to the various rooms. The specific construction of the conduits 19 and 21 is more clearly illustrated in Figs. 3 and 4. As will be seen from an inspection of these figures the lower end of each pipe or conduit 19 is provided with an in-turned flange 22 serving to support a plurality of open ended tubes 23 bound together by insulated wire 24, through which an electric current may be passed, said insulated wire being connected to any suitable source of electric energy by the terminal wires 25. The passage of a current through the coil serves to convert these tubes into electro magnets, through the cores of which the air passes. The air is heated by the electric current while passing through the cores and under the influence of the current.

Supported directly above the tubes and their inclosing coil, I provide a short rotatable shaft 26 carrying a helical web or vane 27. The shaft 26 is supported so as to rotate, and the edges of the vanes extend a sufficient distance outward, to interrupt the direct flow of air and cause the same to become thoroughly agitated and more thoroughly brought into contact with the heated surface. Directly above the shaft and its helical web, I provide a second helical web 28 carried by the inner wall of the tube, and also serving to retard the air and cause an increased agitation, and heating thereof. Above the web 28 I provide an enlargement 29 within the tube, access to which may be gained by any suitable form of closure 30. Supported upon a suitable spider 31 within this enlargement is a pan or other receptacle 32 adapted to contain water, and whereby the air may be moistened to the desired extent. Within the horizontal portion 21 of the conduit, I provide a further resistance to the passage of the air. In this case the resistance takes the form of a barbed spiral coil 33, which may or may not be connected in circuit with any suitable source of electrical energy. By means of the obstructions within the conduit 19, a resistance is offered to the passage of the air and the air is thus subjected to the heating effect for a greater length of time. The helical web 28 also serves to increase the radiating service and facilitate the rapid heating of the air. By passing an electric current through the wires 24 and 33, these wires become heated and add to the heating effect created by the furnace. This heating action may be relied upon solely if the weather is not too cold and when it is desired to have the air pass through certain of the conduits. Surrounding this portion of the conduit is an inclosing casing 34 of insulating material, whereby the heating effect produced within the furnace or by the coils may be conserved. The outer ends of the conduits 21 may be connected to the rooms of the building in any suitable manner, as, for instance, by passages 35 located within the walls of the building and conduits 36 leading directly to the rooms.

To facilitate the removal of the exhausted air from the rooms, I provide a plurality of conduits 37 leading from the interior of the rooms adjacent the floor to the furnace, within which the conduits are connected to vertical pipes 38 supported above the grate 12, and leading into a chamber 39 in the upper portion of the furnace. This latter air chamber is connected directly to the chimney 13 above referred to by means of a conduit 40 located adjacent the conduit 14 and also provided with a damper, if desired. Within the furnace I surround each of the conduits 38 by a coil of wire adapted for the passage of an electric current, whereby the conduits may be heated by electrical energy rather than by the heat of combustion. The coils upon the various conduits 38 are preferably connected in series, and the terminal wires 41 and 24 preferably extend to a suitable switch board (not shown). The air in passing through the conduits 38 is heated either by the influence of the coil or by the heat of the fire upon the grate 12, and the strong upward draft created within the pipe causes a suction of the air down the pipes 37 and a consequent withdrawal of the outer air from the living rooms and a delivery of the same to the chimney 13.

For withdrawing the exhausted air from the rooms upon the upper floors, it may not be found convenient to extend the exhaust conduits to the furnace, but these conduits may lead directly to the chimney. In the plans illustrated, I provide the upper rooms with exhaust conduits 43, one end of each of which communicates with the interior of the rooms, and the other end of each of which extends a short distance up within the chimney 13. These conduits may be heated by the exhaust gases from the furnace, passing up the chimney, or may be provided with coils of wire surrounding the same and arranged in circuit with the wire 42, whereby the said conduits may be heated electrically.

In most of the hot air furnaces now in use a single air chamber and a plurality of pipes leading therefrom are provided, but in this construction a much larger portion of the air passes out through the shorter pipes and to the rooms in the immediate vicinity of the furnace than passes out through the longer pipes. In my improved construction above described, a supply of air for each different conduit is heated separately and the supply of air to one room cannot in any way interfere with the supply to any other room. Furthermore, it is possible when heating by means of the electric currents to heat only the conduit leading to a single room, and thus it is possible to heat this room without heating any other room in the building.

Having thus described my invention, I claim as new and desire to secure by Letters Patent:

1. A heating and ventilating system, comprising a heating furnace, an air delivery conduit below the same, conduits extending upward from said delivery conduit and through the heating space of said furnace, means connected thereto for delivering the heated air to the rooms, an air conduit above the heating space of said furnace, return air conduits leading from said rooms upward through the heating space into said last mentioned conduit, and means connecting said conduits with the outside atmosphere, whereby an automatic circulation of air to and from the rooms is established.

2. A heating and ventilating system, comprising a furnace having a heating chamber, a grate within the same, a main air supply conduit below said grate and out of communication with the heating space, branch conduits extending upward from said main conduit and through the heating space of the furnace, conduits connected thereto and delivering to the rooms, a main air return conduit in the upper portion of said furnace but out of communication with the heating space thereof, return conduits leading from the rooms and extending upward therethrough into said main return conduit, and a conduit connecting said main return conduit with the chimney of the furnace.

3. A heating and ventilating system, comprising a heating furnace having oppositely disposed walls and a top wall inclosing a heating space, a bed plate, a grate mounted above the same, means for delivering air to the space beneath said bed plate, conduits extending from said space beneath the bed plate through the heating space upon opposite sides of the grate and through the top wall, means connecting said conduits with the interior of the rooms to be heated and ventilated, said top wall having a main air return conduit disposed therein, return conduits leading from the rooms through the side walls of the furnace and upward through the heating space into said main return conduit, a chimney, a conduit connecting said chimney with the heating space of the furnace, and an independent conduit connecting said chimney with the air return conduit in the top wall of the furnace.

In testimony whereof I have signed my name to this specification in the presence of two subscribing witnesses.

WILLIAM R. MACDONALD.

Witnesses:
ALBERT B. SMITH,
H. T. MACDONALD.